July 29, 1969     D. D. ALLEN ETAL     3,458,029
PIT CLEANER FOR ANIMAL HOUSES
Filed Aug. 3, 1967
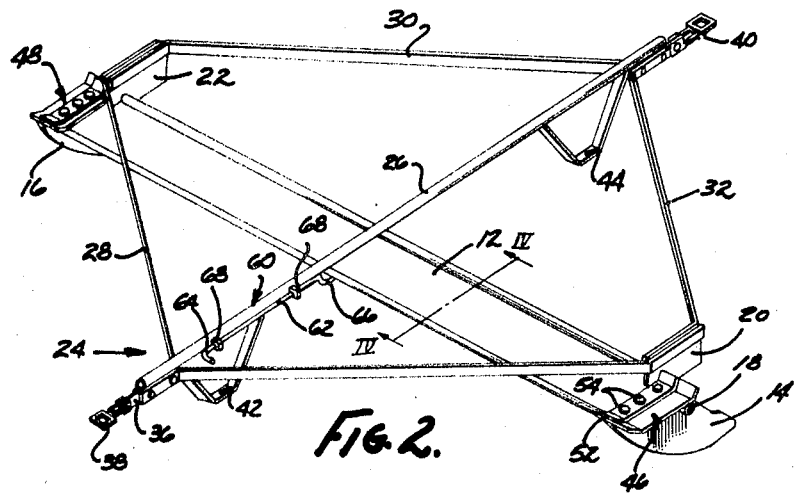
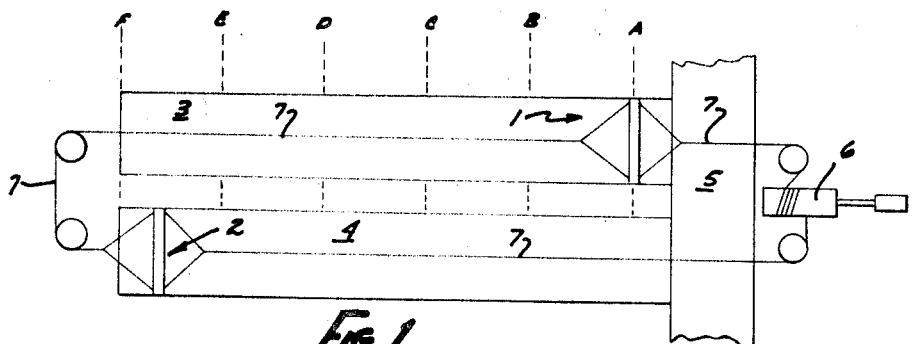
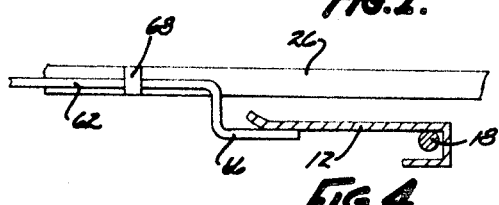
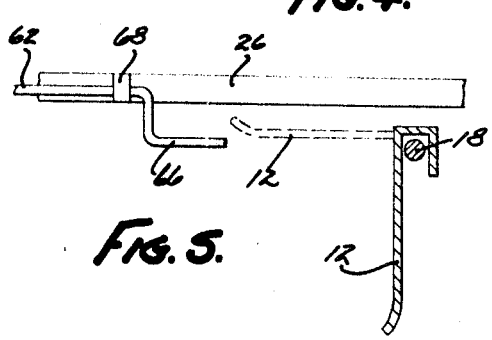
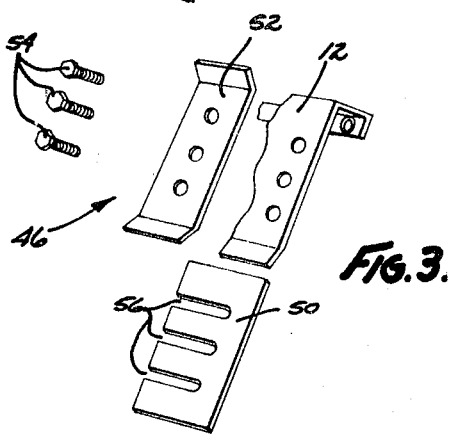
INVENTORS
DEE DEXTER ALLEN
WILLIAM R. COMBER
BY *Price, Heneveld
Huizenga & Cooper*
ATTORNEYS

# United States Patent Office 3,458,029
Patented July 29, 1969

3,458,029
PIT CLEANER FOR ANIMAL HOUSES
Dee Dexter Allen, Zeeland, and William R. Comber, Holland, Mich., assignors, by mesne assignments, to U.S. Industries, Inc., New York, N.Y., a corporation of Delaware
Filed Aug. 3, 1967, Ser. No. 658,186
Int. Cl. B65g 25/08; A01k 31/00
U.S. Cl. 198—224     23 Claims

ABSTRACT OF THE DISCLOSURE

A pit cleaner of the type having a scraper blade which pivots into a lowered position for scraping during a work stroke and into a raised position for movement without scraping during a return stroke, wherein a frame is provided for mounting the blade so that it may be pulled through the pit. This frame has a rigid structural member which lies transversely of the blade and passes over the top of it to extend both forwardly and rearwardly thereof. It also has frame elements extending between the ends of the said frame member and the ends of the blade structure. The aforesaid frame member passing over the top of the blade carries a locking element which operates in a manner similar to a latch bolt and engages the blade when the latter is in its raised position, to hold the blade in this position when it is moved within the pit in either of the two possible directions and thereby preclude scraping operation during such movement when this is desired. Also, the aforesaid frame member which extends forwardly and rearwardly of the blade carries downwardly-depending runner means for engaging the bottom of the pit upon rocking or dipping movement of the frame, to thereby positively limit the allowable extent of such movement so that the scraping operation of the blade will not be affected thereby. Further, a resilient extension is provided which is adjustably attached to either end of the blade, so that it may, in effect, be adjusted to fit a particular pit and, when so adjusted, will flexibly deform to accommodate the sidewalls of pits which are not exactly the same distance apart throughout the length of the pit, as is normally the case.

Background of the invention

This invention relates to pit cleaners for animal and/or poultry houses, and more particularly to pit cleaners having a scraping blade which is pivotally mounted to move downwardly toward and against the bottom of the pit during a work stroke in which it scrapes the bottom and moves upwardly away from the pit bottom during a non-scraping return stroke.

This general type of pit cleaner has been used for a considerable length of time with relatively good results, and its basic operational capabilities are generally regarded as being basically well-suited for the difficult task of cleaning manure pits in animal houses. Previous pit cleaners of this general type have not been without their limitations, however, and despite their inherent good points, have acquired a reputation for being prone to problems and difficulty in many circumstances.

Firstly, pit cleaners of this type are pulled through the pits by winch-powered cables attached by Y-type cable harnesses to the two ends of the scraper blade. Since work strokes and return strokes of the scraper blade are both necessary, the winch cable is attached on both sides of the blade. Experience has shown that it is necessary to maintain a very high degree of tension loading on the winch cable in order to prevent slippage of the cable on the drum of the winch. In previous devices this excessive force was transferred directly to the ends of the blade itself, and this very often produced warping and bowing of the blade. Further, standardized lengths for the blade have been selected which correspond to the width of the pits most frequently encountered, and pits are now usually constructed with a particular width adapted to receive a particular pit cleaner blade. However, the pits are generally of poured concrete construction wherein complete accuracies are not readily obtainable, and the actual separation between the sidewalls of the pit almost always varies somewhat along its length. Thus, at certain places the blade is likely to be pinched between the sidewalls, creating significant amounts of fiction on the blade, whereas in other places the blade does not reach completely across the pit, thereby leaving residues which are not cleaned. Also, the scraper blade and its attachment harness has been known to rock or dip vertically during its operation, causing defective or deficient operation.

Finally, and of considerable importance, pit cleaners of this type are typically installed in pairs, with one scraper blade in each of two parallel header or leader pits communicating at one end with a common primary pit leading out of the animal house. Such an installation is illustrated in FIG. 1 herein to better show the problems which occur in connection with it. As seen here, a pair of pit cleaners 1 and 2 are located in adjacent parallel header pits 3 and 4, each communicating with a transversely-oriented primary pit 5 which leads out of the animal house. A winch 6 operates a cable 7 which leads from a drum on the winch to each of the pit cleaners 1 and 2, passing around appropriate idler wheels or drums at each respective corner. As shown, when one of the pit cleaners is positioned forwardly in its respective pit, i.e., adjacent or near the primary pit 5, the other pit cleaner is positioned rearwardly, so that a first direction of movement of the cable 7 moves one pit cleaner toward the primary pit 5 on a work stroke while simultaneously moving the other pit cleaner in the opposite direction on a return stroke.

It typically happens that the farmer or other operator does not run his pit cleaner installation as frequently as he should. This causes the pits 3 and 4 to be far too full of droppings or manure to be cleaned by a simple one-stroke operation of the scraper blades in which each traverses the entire length of its respective pit. A good solution to this problem would be to back pit cleaner 1 from position (A) to position (B) on a partial return stroke, during which the scraper blade pivots upwardly over the accumulated manure in the pit, so that when this pit cleaner is then moved forwardly from position B to position A, this segment of pit 3 will be cleaned. Thus, the entire pit 3 could be cleaned by a succession of partial return and work strokes, during each one of which the total load placed on the scraper blade by the over accumulation in the pit would be within the operational limits of this single pit cleaner. However, such an operation is prevented by the fact that during each of the partial return strokes of pit cleaner 1 pit cleaner No. 2 is moved toward the primary pit 5, against the entire accumulation in pit 4. This exceeds the operational capabilities of pit cleaner 2, since it in effect is being asked to clean the entire interior of pit 4 by a series of forward and backward movements. This causes jamming of the scraper blade and virtually certain malfunction of pit cleaner 2, so that not only must the operator then clean both pits manually, he also must then repair or even replace his pit cleaners.

Summary of the invention

The present invention overcomes the limitations of previous pit cleaners noted above. In the first place, the present invention provides a mounting frame for the pivotal scraper blade in which the full tension of the winch cable is not applied directly to the scraper blade, thereby eliminating the bowing and warping in previous constructions. Also, the mounting frame of the present invention includes downwardly depending runner means for contacting the bottom of the pit to prevent undesired dipping or pitching of the pit cleaner about its scraper blade, and the scraper blade is provided with flexible extensions for readily accommodating manure pits in which the spacing of the sidewalls varies along the length of the pit, to prevent binding of the blade at the narrow places and also to thoroughly clean the pit at wider places. Moreover, the present invention provides a novel locking means carried by the aforementioned frame, for engaging the scraper blade in its upright position wherein it is retracted or raised away from the bottom of the pit and the manure therein. This allows the progressive cleaning of overloaded pits through the series of partial work strokes and return strokes noted previously, since by the present invention the scraper blade of either pit cleaner may be temporarily locked into an inactive position while the other pit cleaner blade is used in work strokes of progressively increasing length, to first clean one and then the other of a pair of parallel adjacent pits.

Description of the drawings

FIG. 1 is an overhead plan view on a reduced scale of a typical pit cleaner installation;

FIG. 2 is an enlarged prospective view showing the pit cleaner of the present invention;

FIG. 3 is a further enlarged fragmentary prospective view of one end of the scraper blade of the present pit cleaner, showing details of the extension means therefor;

FIG. 4 is an enlarged, fragmentary sectional elevation through the plane IV—IV of FIG. 1, showing details of the locking means; and FIG. 5 is a sectional elevation similar to FIG. 4, showing the locking means disengaged from the scraper blade.

Description of a preferred embodiment

In the pit cleaner 10 of the invention, seen in overall prospective in FIG. 2, the scraper blade 12 has secured near either end thereof a rocker element, designated 14 and 16, respectively. Each of these rocker elements comprises in essence a plate-like member in the form of approximately a quarter circle. These elements act as runners for the blade 12, such that as the blade is moved along a pit it slides upon the two rocker elements and is pivoted or rotated about its upper portion by the rocking motion of the rocker elements caused by dragging the latter upon the bottom of the pit. When moved in a first direction, the blade will be pivoted into generally vertical orientation, in which it scrapes the bottom of the pit. When moved in the opposite direction, the blade is pivoted into a generally horizontal orientation, in which it passes over the pit bottom and the manure lying thereupon.

In mounting the blade 12 and the rocker elements 14 and 16 secured thereto, a pivot shaft 18 (FIGS. 2, 4 and 5) is secured to the rocker elements and passes slidably through a pair of generally upright end plates 20 and 22, which thus suspend the blade and its rocker elements. These end plates form a part of the frame or carriage by which the pit cleaner is pulled within the pit. The basic structural arrangement of the scraper blade, rocker elements and end plates just noted is now known in the art and is described in detail, for example, in copending application Ser. No. 525,259, now Patent No. 3,409,120, assigned to the assignee of the present invention. Consequently, no further detailed description of this structure is deemed necessary in the present application.

In accordance with the present invention, a novel frame 24 (FIG. 2) is provided for attachment to the winch cable which pulls the scraper blade through the pits. Frame 24 comprises an elongated central tension member 26, preferably a rigid member such as a pipe or the like, which extends transversely of the blade 12 and passes over the top of the same, extending both forwardly and rearwardly thereof an appreciable extent. Also, the frame comprises a plurality of frame elements 28, 30, 32, 34, which extend diagonally or obliquely of the tension member 26, between each of the ends of the latter and the adjacent laterally disposed ends of the blade 12. More specifically, each of the aforesaid frame elements are preferably of rigid metal bar stock and are somewhat Z-shaped, with a short offset end of elements 32 and 34 being attached to the upright end plate 20 near one end of the scraper blade, and a similar short offset portion of frame elements 28 and 30 similarly attaching to upright end plate 22, at the other end of the scraper blade. The converging ends of frame elements 28 and 34, near the front of the pit cleaner, are connected together on either side of a strap member 36 having at its free end a ring 38 or the like for connection to the winch cable which will pull the pit cleaner through its pit. Similarly, the converging ends of frame elements 30 and 32, at the rear of the pit cleaner, are connected together to mount a strap member and ring means designated generally by the numeral 40. The aforementioned central tension member 26 extends between the interconnected ends of frame elements 28 and 34 at the front of the pit cleaner and the interconnected ends of frame elements 30 and 32 at the rear of the pit cleaner, and is rigidly secured at each such point by welding or the like.

The frame structure just described produces important operational results for the present pit cleaner, in that with the winch cable attached to the ring members 38 and 40 at the front and rear of the frame, the high tension forces present in the cable merely to prevent it from slipping on the winch head or drum are not imparted to the scraper blade itself, as has generally been true in previous constructions. Instead, this large tension force is merely applied through the ring members 38 and 40 to the central tension member 26 of the frame, which thus becomes in effect a link in the winch cable itself. Thus, while the winch cable is not actually being moved to pull the pit cleaner in either direction within a pit the tension force on the winch cable is applied only to tension member 26, and no force whatever is applied to the scraper blade; also, when the blade is being pulled through a pit in either direction, the only forces actually applied to the blade is that force applied by the load which the blade encounters while moving within the pit, i.e., the refuse in the pit and the frictional forces acting on the edges of the blade. Thus, a scraper blade carried by the present frame will not exhibit a tendency to warp and bow within the pit and will therefore have a much longer useful life.

Another feature of the present frame assembly is the presence of a pair of runner means 42 and 44 (FIG. 2), which depend downwardly from the central tension member 26 near its forward and rearward end. As illustrated, the runner means may be in the form of generally U-shaped sections of bar stock similar to that making up the frame elements 28, 30, and the like, with each runner means preferably having a generally flat area along its bottom. The downward extent of each of the runner means is preferably slightly less than the nominal distance from the member 26 to the bottom of the pit in which the pit cleaner is to be mounted, so that if the member 26 is in a generally horizontal attitude, neither of the runner means will actually be in contact with the bottom of the pit. However, whenever forces are present which tend to rock or pitch the pit cleaner assembly about its scraper blade, either the forward or rearward runner means will immediately contact the bottom of the pit to prevent any further such rocking or pitching. This maintains the ring elements 38 and 40 well above the bottom of the pit and maintains the member 26 in its generally horizontal attitude, to prevent rocking of the scraper bar 12 within the pit, thereby keeping the blade in its desired orientation with respect to the pit bottom for optimum scraping operation.

In accordance with the present invention, an extension means 46 and 48 is provided for each of the two opposite ends of the scraper blade 12. These are illustrated generally in FIG. 2 and specifically in FIG. 3, wherein the details of their construction will be seen. Each of the extension means comprises a stiffly resilient extension element 50 which is preferably a relatively thick or heavy sheet of rubber, plastic, or the like. These stiffly resilient extension elements are placed against the outer surface of the scraper blade at its end extremities, and secured thereto by an attachment plate 52 having a series of bolt holes formed therein for receiving appropriate bolts 54. A similar series of bolt holes is formed in the end extremity of the scraper blade 12, as illustrated, and the extension element 50 preferably has a corresponding series of slots 56, through which the bolts 54 may pass, such that the bolts extend through the attachment plate 52, the extension element 50, and the scraper blade 12, with appropriate nuts for each bolt 54 being provided, preferably located on the underside of the scraper blade, where they may be "tacked" by welding. Such nuts and bolts, together with the attachment plate 52, will therefore be seen to detachably secure the extension elements to the scraper blade. The slots 56 in the extension elements provide for lateral adjustment thereof with respect to the scraper blade, such that by loosening the bolts 54 the extension element will be slidable laterally with respect to the scraper blade, to thereby in effect adjust its overall length.

As illustrated in FIGS. 2, 4, and 5, the frame assembly 24 of the present invention carries a locking means 60, located on the forward extremity of the central tension member 26. In essence, the locking means 60 comprises a latch bolt 62, preferably in the form of an elongated rod having a right-angle offset 64 at one end to serve as a handle and having also a downwardly-depending portion 66 at its other end for engaging the scraper blade 12 when the same is in its raised position (FIG. 4), wherein it occupies a generally horizontal attitude. The latch bolt 62 is carried upon the frame member 26 by a pair of mounting blocks 68, which are secured to the side of this member and through which the latch bolt is longitudinally slidable.

The manner in which the downwardly-extending portion 66 of the latch bolt 62 is engaged with and disengaged from the scraper blade 12 is shown in FIGS. 4 and 5, and will be quite clear merely upon inspection. As stated, the latch bolt 62 is slidable with respect to its mounting blocks 68. The blade-engaging portion 66 should extend sufficiently below frame member 26 so that when the scraper blade 12 is raised to its inactive (i.e., non-scraping) position shown in FIG. 4 the portion 66 will slide directly beneath the scraping edge of the blade as the latch bolt 62 is slid rearwardly with respect to frame member 26. In this manner, the scraper blade 12 will be held in its generally horizontal non-scraping position so that the pit cleaner may be moved in either direction within the pit in which it is located without performing any scraping operation. Because the portion 66 indexes immediately below the scraper blade 12, it blocks the blade and holds it in its upright position, even though the blade itself tends to be pivoted about pivot bar 18 into its scraping position during forward movement of the pit cleaner.

As will be clear, the scraper blade may be readily unlocked to perform its normal functions merely by grasping the handle portion 64 of the locking means and pulling the latch bar 62 forwardly of the frame member 26, thereby moving the offset portion 66 of the latch bar to the position shown in FIG. 5, wherein it is clear of the scraper blade regardless of the pivotal position of the latter. Thus, the scraper blade may, in effect, be disabled from scraping operations whenever desired and the pit cleaner of the invention moved backwardly and forwardly within its pit without generating any scraping operation.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:
1. In a pit cleaner for an animal house, of the type having a pivotal scraper blade which when placed transversely within and pulled through a manure pit in a first direction pivots toward the bottom of said pit and into a generally vertical position for scraping the manure from such pit in a work stroke and when pulled in a second direction opposite said first direction pivots away from the bottom of the pit and into a generally horizontal position to pass over manure in the pit on a return stroke, the improvement comprising: a locking means actuable to hold said scraper blade away from the bottom of said pit and in its said generally horizontal position, such that said blade is precluded from scraping when moved in either of its said directions.

2. The improvement in pit cleaners defined in claim 1, wherein said locking means comprises a mechanical element engageable with said blade and movable to and from a position holding said blade in said position and away from said pit bottom.

3. The improvement in pit cleaners defined in claim 2, wherein said element comprises a latch bolt which engages said blade by blocking its return toward said pit bottom.

4. The improvement in pit cleaners defined in claim 3, wherein said latch bolt has a handle portion and is manually actuable.

5. In a pit cleaner for an animal house, of the type having a pivotal scraper blade which when placed transversely within and pulled through a manure pit in a first direction pivots toward the bottom of said pit and into a generally vertical position for scraping the manure from such pit in a work stroke and when pulled in a second direction opposite said first direction pivots away from the bottom of the pit and into a generally horizontal position to pass over manure in the pit on a return stroke, the improvement comprising: a frame for mounting said blade to be pulled through said pit; said frame comprising a structural member located in a plane transversely intersecting said blade; said member extending both forwardly and rearwardly of said blade and being attachable at its end extremities to a winch cable or the like; and said frame further including frame elements extending between the said end extremities of said member and said blade, to pull the blade when said member is pulled by said cable.

6. The improvement in pit cleaners defined in claim 5, wherein said structural member is free of and unconnected to said blade at said intersection.

7. The improvement in pit cleaners defined in claim 6, wherein said frame structural member passes freely over the top of said blade, and wherein said frame elements extend between the ends of said member and the ends of said blade.

8. The improvement in pit cleaners defined in claim 5, wherein said frame further includes a downwardly-extending runner means near at least one of the ends of said structural member, for contacting said pit bottom to prevent downward dipping of such end.

9. The improvement in pit cleaners defined in claim 6, wherein said frame further includes a downwardly-extending runner means near at least one of the ends of said structural member, for contacting said pit bottom to prevent downward dipping of such end.

10. In a pit cleaner for an animal house, of the type having a pivotal scraper blade which when placed transversely within and pulled through a manure pit in a first direction pivots toward the bottom of said pit and into a generally vertical position for scraping the manure from such pit in a work stroke and when pulled in a second direction opposite said first direction pivots away from the bottom of the pit and into a generally horizontal position to pass over manure in the pit on a return stroke, the improvement comprising: a stiffly resilient extension member attached to at least one end of said blade in adjustable positions, for accommodating the blade to a pit having generally parallel vertical sides whose separation varies at least slightly along the length of the pit.

11. The improvement in pit cleaners defined in claim 10, further including means for attaching and detaching said resilient extension member upon said blade.

12. The improvement in pit cleaners defined in claim 11, wherein said means adjustably attaches said extension to said blade, such that the extension may be shifted laterally to protrude varying distances from the end of the blade.

13. The improvement in pit cleaners defined in claim 11, wherein said blade has one of said extension members attached to each end.

14. The improvement in pit cleaners defined in claim 5, further including a locking means carried by said frame and actuable to hold said scraper blade away from the bottom of said pit and in its said generally horizontal position, such that said blade is precluded from scraping when moved in either of its said directions.

15. The improvement in pit cleaners defined in claim 14, wherein said locking means comprises a latch bolt movable with respect to said frame to and from a position wherein said bolt engages said blade to block its return toward the bottom of said pit.

16. The improvement in pit cleaners defined in claim 15, wherein said latch bolt has a handle portion and is manually actuable.

17. The improvement in pit cleaners defined in claim 14, wherein said frame further includes a downwardly-extending runner means near at least one of the ends of said structural member, for contacting said pit bottom to prevent downward dipping of such end.

18. The improvement in pit cleaners defined in claim 14, further including stiffly resilient extension on at least one end of said blade, for accommodating the blade to a pit having generally parallel vertical sides whose separation varies at least slightly along the length of the pit.

19. The improvement in pit cleaners defined in claim 18, wherein said frame further includes a downwardly-extending runner means near at least one of the ends of said structural member, for contacting said pit bottom to prevent downward dipping of such end.

20. The improvement in pit cleaners defined in claim 19, wherein said locking means comprises a latch bolt movable with respect to said frame to and from a position wherein said bolt engages said blade to block its return toward the bottom of said pit.

21. The improvement in pit cleaners defined in claim 20, wherein said latch bolt has a handle portion and is manually actuable.

22. The improvement in pit cleaners defined in claim 21, wherein said structural member is free of and unconnected to said blade at said intersection.

23. The improvement in pit cleaners defined in claim 22, wherein said frame structural member passes freely over the top of said blade, and wherein said frame elements extend between the ends of said member and the ends of said blade.

References Cited

UNITED STATES PATENTS

| | | | |
|---|---|---|---|
| 974,701 | 11/1910 | Olson | 172—736 |
| 2,552,743 | 5/1951 | Simpson | 198—224 |

FOREIGN PATENTS 867,284   5/1961   Great Britain.

EDWARD A. SROKA, Primary Examiner

U.S. Cl. X.R.

119—22